(12) United States Patent
Wiklund

(10) Patent No.: US 6,176,018 B1
(45) Date of Patent: Jan. 23, 2001

(54) POSITIONING DEVICE

(75) Inventor: Rudolf Wiklund, Taby (SE)

(73) Assignee: C. E. Johansson AB, Eskilstuna (SE)

( * ) Notice: Under 35 U.S.C. 154(b), the term of this patent shall be extended for 0 days.

(21) Appl. No.: 09/142,858

(22) PCT Filed: Mar. 19, 1997

(86) PCT No.: PCT/SE97/00456
§ 371 Date: Sep. 16, 1998
§ 102(e) Date: Sep. 16, 1998

(87) PCT Pub. No.: WO97/35163
PCT Pub. Date: Sep. 25, 1997

(30) Foreign Application Priority Data

Mar. 20, 1996 (SE) .................................................... 9601069
Nov. 21, 1996 (SE) .................................................... 9604272

(51) Int. Cl.$^7$ ...................................................... G01B 5/008
(52) U.S. Cl. .............................. 33/1 M; 33/32.3; 33/443; 33/444; 33/503
(58) Field of Search ..................................... 33/1 M, 32.3, 33/438, 439, 440, 441, 442, 443, 444, 503

(56) References Cited

U.S. PATENT DOCUMENTS

| | | | |
|---|---|---|---|
| 4,651,426 | * 3/1987 | Band et al. | 33/1 M |
| 4,928,396 | 5/1990 | Raleigh | 33/503 |
| 4,964,221 | * 10/1990 | Breyer et al. | 33/503 |
| 5,072,522 | * 12/1991 | Stott et al. | 33/503 |
| 5,339,531 | 8/1994 | Ogiwara | 33/503 |

* cited by examiner

*Primary Examiner*—Diego Gutierrez
*Assistant Examiner*—Yaritza Guadalupe
(74) *Attorney, Agent, or Firm*—Young & Thompson

(57) ABSTRACT

A measuring machine produces an essentially linear movement in a moving part by transforming rotary movement to linear movement through a transmission element having a high modulus of elasticity in a longitudinal direction, and which is flexible in a transverse direction. The transmission element has two ends which are each fastened to the same mechanical element, and the transmission element is given a pre-stress which is greater than a maximum force encountered during acceleration while the machine is in use.

7 Claims, 3 Drawing Sheets

POSITIONING DEVICE

BACKGROUND OF THE INVENTION

The present invention relates to a device for producing an essentially linear motion in a moveable part in a measuring machine where a transmission from a rotary motion to a linear motion takes place.

During the positioning of measuring robots there are very large requirements for low friction between a movable measuring carriage with a measuring bridge, a shaft and a measuring tip, and a fixed part.

Normally, a transmission to the carriage is used which gives a high rigidity in the positioning direction and a running action which is, relatively, as smooth as possible. This is done, for example through a plain shaft drive, e.g. such as is used in the CEJ-Cordimet marketed by C E Johansson, or by a belt drive (re-inforced toothed belt, e.g. CEJ-Saphir) or a cog against a fixed rack, or by a screw and nut.

Other variations of the type using a steel band have been produced, but this has led to very high parallel alignment requirements on the drive shaft and the moving part or carriage, with high manufacturing costs as a consequence.

Bands, belts, plain shafts, screw/nuts and racks also easily lead to torques and forces which tend to deviate from the direction of movement being transmitted to the carriage, with subsequent scattering of the measurement result.

BRIEF SUMMARY OF THE INVENTION

One object of the invention is to produce a device for linear movement of a measuring carriage or the like, relative to a physical coordination axis, without the carriage being influenced materially by turning movements or forces in directions other than the direction of movement.

Yet one object of the invention is to minimize so-called random frictions in a measuring robot with a device for linear movement of a measuring carriage.

According to the invention a device for producing an essentially linear movement of a moving part in a measuring machine, where the power transmission takes place from one type of movement (e.g. rotary movement from a servo motor) to the linear movement, is characterized by a transmission element having a high coefficient of elasticity in a longitudinal direction and being flexible in the transverse direction of which one end is fastened to the same mechanical element as its other end, and that the transmission element is given a pre-stress which is greater than the maximum force encountered when accelerating during the transmission operation. The pre-stress can be applied by a force-providing element in the form of a pre-tensioning spring placed between one end of the transmission element and a fixed point, or by the elasticity of the transmission element itself, the force of which the strength is greater than half the maximum acceleration force. An alternative is that a controllable clamping arrangement is controlled during use to tension the force-providing element in the vicinity of one of its ends, whereby the pre-stress then is formed by the elasticity of the transmission element, and that the same end is fastened by means of a spring pre-tension to a fixed point, and that the clamping means is controlled to not clamp on the transmission element when the device is idle.

BRIEF DESCRIPTION OF THE FIGURES

The invention is described more closely below by means of embodiments with reference to the appended drawings, where.

DETAILED DESCRIPTION OF THE EMBODIMENTS

Figure 1:
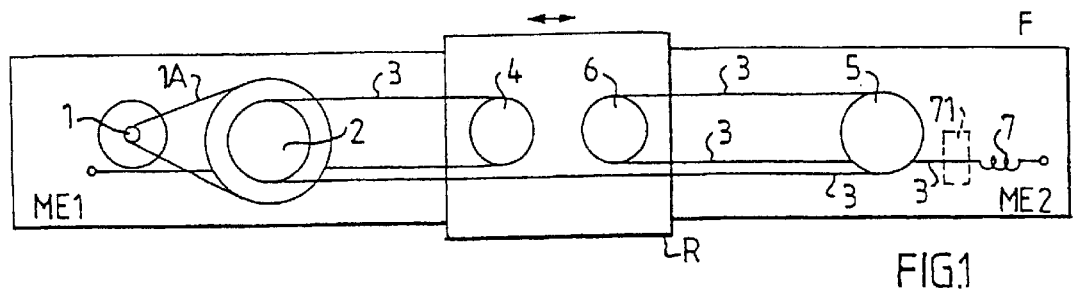
FIG. 1 shows a first embodiment of a device according to the invention.

A device according to FIG. 1 solves the most important problems of the previously known arrangements.

The device relates to the positioning (or the verifying) of an essentially linear movement of a movable part R, e.g. a measuring carriage in a measuring machine, where the transmission takes place from one type of movement, e.g. from a rotatable servo motor, to a linear movement. A transmission rope 3 which has a high modulus of elasticity in the longitudinal direction and which is flexible in the transverse direction is attached by one end ME1 to the same mechanical element, the beam F in the embodiment of FIG. 1, as its other end ME2. By means of a force-producing element 7 (spring) the element 3 is given a pre-stress, which is greater than the maximum force during acceleration during use. It should be noticed that the rope 3 itself also has a certain modulus of elasticity, whereby the spring 7 in certain applications can be functionally equivalent to the elasticity of the transmission rope or line.

Driving takes place preferably by means of a V-groove in a drive wheel 2. The V-groove firmly pinches the rope 3 which runs in the groove so that friction between the wheel and the rope is so large that slippage is prevented. The wheels 4 and 6 or 2 and 5 are preferably angled so that the rope can be tensioned directly without being obstructed when passing through the wheel block 4, 6 on the movable part R. The rope 3 shall essentially run parallel with the movement vector for the movable part R but shall be free from the wheels and other units on both the beam F and the movable part R. The friction between the rope 3 and the respective running wheels 4, 5, 6 should be low and the wheels should be able to run freely, e.g. by being mounted in ball bearing or the like.

The positioning motor 1 (the servo motor) transmits torque to a transmission, e.g. directly or according to FIG. 1. In a transmission segment 1A to the drive wheel 2, which in this embodiment is a V-grooved pulley wheel, runs an elastic steel wire (piano wire) or a tight rope 3, with a relatively high modulus of elasticity, e.g. made of aramid, polyethylene, or a glass/carbon fibre reinforced rope. The rope 3 runs further to a pulley wheel 4 with a preferably smooth round base on the moving part R over a pulley wheel 5 rotatably mounted on the other fixed side of the movable part R on the beam F, and then via a pulley wheel 6 rotatably mounted on the movable part R in order to be fastened by an end ME2 fixed to the beam F either by some type of tension arrangement, e.g. the spring 7, tension cylinder or solder, or directly. The other end of the line is fixed to the beam F at ME1.

By means of this device the desired transmission from the driving motor can be achieved without play and stiffness in the axial direction (direction of movement), as having well as a very low reaction force in the transverse direction.

The device can also be equipped with a thin steel band which extends laterally only a small amount e.g. 4 mm, or a band of glassfibre or plastic material. The advantages of a band compared to a round material are that a smaller bending radius can be permitted which allows higher gearing possibilities while imposing a relatively low lateral stiffness.

In an alternative embodiment of FIG. 1, the rope 3 is locked during use through a clamping device, schematically shown with the dashed block 71. During idle periods in the working cycle of the measuring robot, this clamping device 71 is released, whereby the tension element (the spring 7) can exert its force on the rope 3 and stretch it. In this way, the advantage can be obtained of having a rigid fastening of both ends of the line during use while at the same time the tension on the line is automatically held constant during its lifetime, even if a certain permanent stretching of the line 3 would occur.

It can be preferable to have embodiments with double, treble and so on, block-like arrangements so that one can achieve high transmission ratios as well as high positioning rigidity with a very low transmission friction in the transmission steps and a high ground resonance in the servo link. This leads in turn to a high speed constancy during measuring which is vital for a good reproducibility of the measurements. It is possible, for example, to have the same type of block arrangement on each side of a beam, whereby the blocks thereby can be fastened to each other on the upper side.

Figure 2:
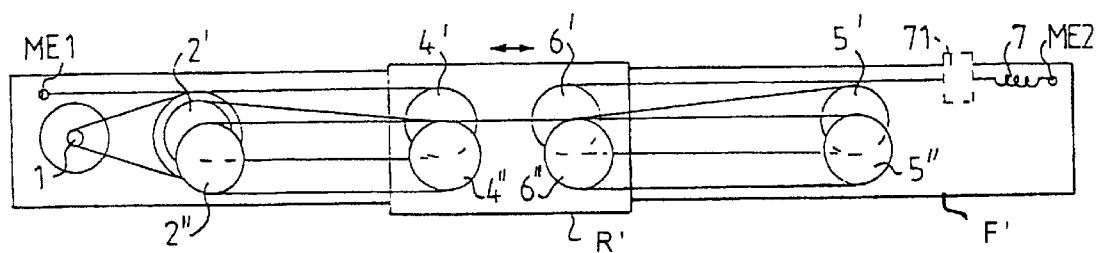
FIG. 2 shows a second embodiment of a device according to the invention.

An arrangement with a doubling of the arrangement in FIG. 1 with a block R' is shown in FIG. 2. Wheels 4', 4" are here advantageously attached somewhat at an angle and displaced but mounted on the same shaft, preferably on each side of the block R', although it is also possible to have them both on the same side. In this way a displacement between the rope on one side compared to the other side is achieved so that the next pair of wheels 4" and 6", which lie outside 4' and 6', have a parallel rope connection with the fixed wheels 2' and 2" and 5' and 5" on the beam F'. Naturally, as an alternative or as a complement, the fixed wheels can be angled.

Consequently, according to the arrangement above, one can achieve
(1) High servo rigidity in the desired direction of motion
(2) Low rigidity in the direction transverse to the direction of motion
(3) Low effects from angular errors through the deviation of the centre of gravity from the centre of power (through low speed variation)
(4) Low friction (consistent speed during measuring)
(5) Low manufacturing price
(6) Quiet operation—free of vibrations
(7) No transfer of torsional torque in the plane perpendicular to the direction of movement (contrary to screw and nut and plain shaft drives)
(8) Self-limitation of forces when driving against an obstacle. Maximum transferable force is determined by the force in the spring element 7 and the V-groove angle on the wheel 2 etc.

Figure 3:
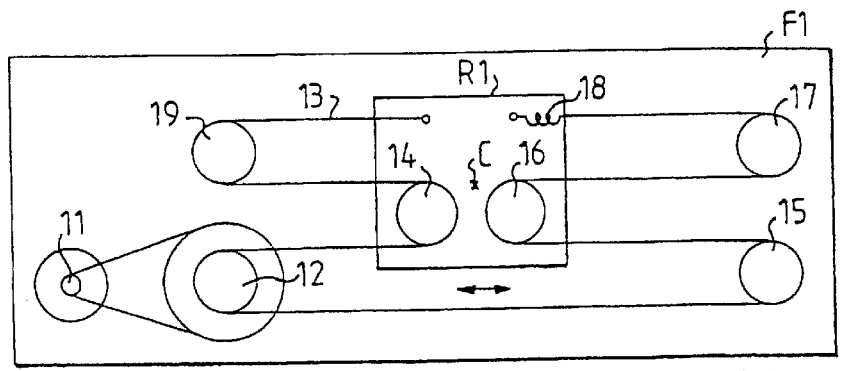
FIG. 3 shows a third embodiment of a device according to the invention.

A third embodiment is shown in FIG. 3, where the fixed points of the tension rope 13 are placed on the movable block R1 instead of on the fixed block or beam F1. The servo motor 11 is placed on the V-shaped tension wheel 12. The tension wheel 12 on beam F is placed between the running wheel 14 on the movable part R1 and a running wheel 15 on the beam on the other side of the movable part R1 from the tension wheel 12. The rope 13 runs from the running wheel 15 over a running wheel 16 on the movable part and a running wheel 17 on the beam and is fastened to the movable part via a spring 18 or another tensioning means at its other end. The transmission ratio in this embodiment is 1:3. Here the centre of power in the movable part is indicated by the letter C. This lies on a central line and somewhere between a line drawn between the centres of the wheels 14 and 16 and a line between the attachment points of the rope.

Figure 4:
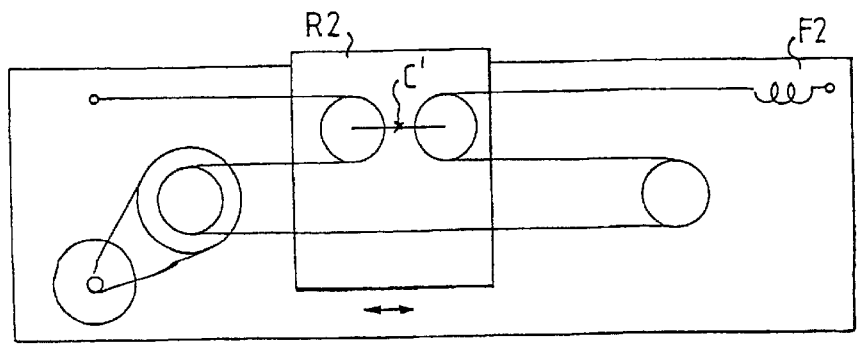
FIG. 4 shows a fourth embodiment of a device according to the invention.

Yet another embodiment is shown in FIG. 4. The rope is fastened to the beam. The centre of power C' lies on a line between the wheel axes of the pair of wheels placed on the moving part.

The embodiments shown in FIGS. 3 and 4 can also be doubled or arranged with displaced and angled wheels on the same axis analogously with the embodiment which is shown in FIG. 2. In principle, any number of wheels could be used.

Figure 5:
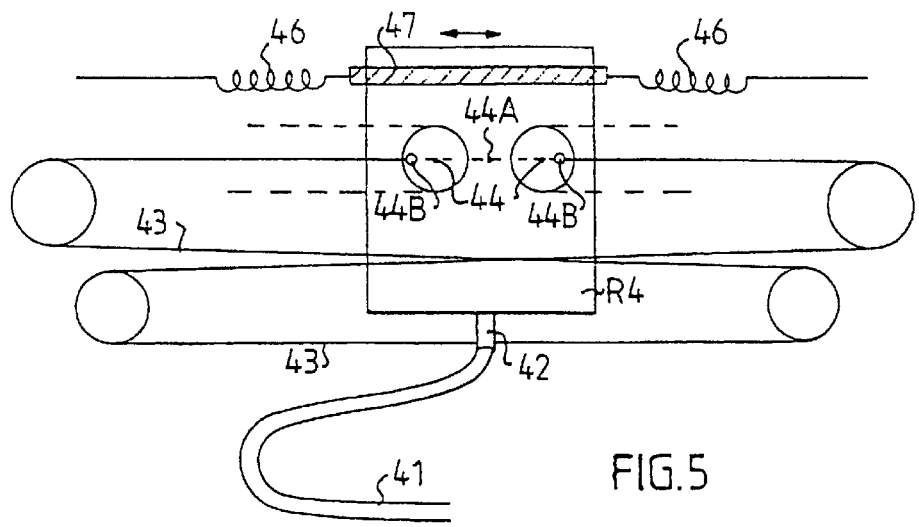
FIG. 5 shows a first embodiment of an arrangement for preventing transfer of torque from a cable end to the moveable part according to the invention.

Measuring robots require for their function certain connections between the movable measuring carriages and surroundings in the form of signal cables and air hoses. A protective bellows connected to the movement of the carriage is required for sealing. The forces which these elements exert easily give rise to torsional torques, which influence the function of the measuring robot in a disadvantageous manner. By equipping these elements with a separate subsystem, these disruptive forces/torques can be considerably diminished. An embodiment of such a subsystem is shown on its own in FIG. 5. This means that lateral displacement of the block R4 can take place according to any of the above described embodiments.

The forces, which are required to hold the cables 41 in the right place without generating torques, respectively the curtain arrangement 46, which protects against dirt and dust, are originally generated from the servo motor (not shown in FIG. 5) and are transmitted to the movable part, but the attachment on the movable part R4 should be where the average force reacts in order to minimize the torques. This means that if there are three ropes which cooperate, the attachment 44B, FIG. 5, shall be placed near to the point of action of the average force. If there is only one disc on each side, the position for the centre of power is where the shaft of the disc runs. In this way, torque is prevented to a large degree from being introduced between the shafts 44 from the transmission cables or the like.

The cables, the air hoses 41, pass over to a weakly tensioned part 42 which in turn is controlled by a separate line system 43. It has the same force provider as the centre 44A for the force provider to the movable part (verified part) R4.

By this simple arrangement the torque and torque changes imparted from the cables to the movable part R4 are minimized.

Similarly, the curtains—protectors 46—are equipped with a rope arrangement with a fixed point on the same unit as 44. In the case of the protectors, these are connected to the movable part R4 with, e.g. a surrounding fixed frame 47 having a soft rubber strip against the movable part R4, and the surrounding frame is controlled in the same way as the cables.

Figure 6:
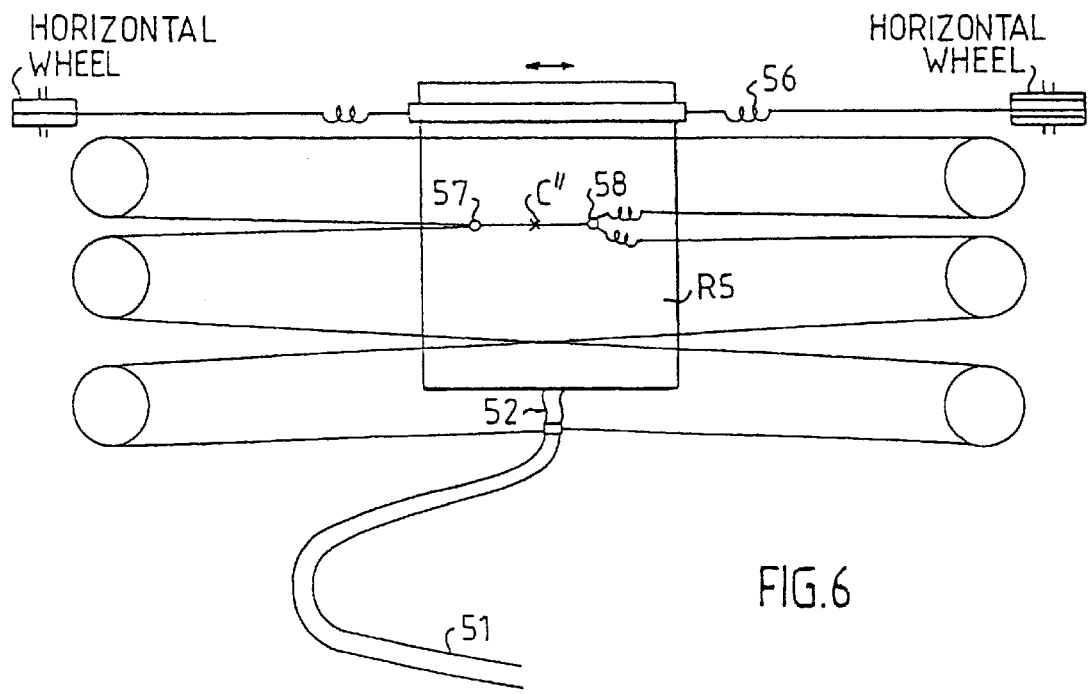
FIG. 6 shows a second embodiment of an arrangement for preventing transfer of torque from a cable end to the moveable part according to the invention.

FIG. 6 shows an embodiment where the cables 51 as well as possible air hoses and similar means are fastened with a flexible connection 52 to the movable part R5.

A double drive system is arranged with its ends fastened to the movable carriage R5. There are no running wheels for the movable part of the separate drive system but the fixed points 57 and 58 for the separate drive system are placed on the same line as the centre C" of the driving force for the movable mass of the carriage R5. In order to achieve zero torque, it is thus necessary that the connection to the movable part takes place in line with the position of the tension producer.

In another embodiment the frame and/or the cables are equipped with the separate rope arrangement which begins on the driving motor shaft with the same transmission ratio as the unit for the rest (not shown). In this way, elimination of rope elasticity between the motor and the movable part is achieved.

In a further embodiment, a separate servo positions the cable and the curtain in relation to the position of the movable part. This is not shown, but means in principle a mirror image-doubling of the arrangement shown in FIG. 5, where the frame 47 in the doubled arrangement is attached, in analogy with the fastening 42, to the hose 41. Thereby the errors caused by influence from the cables on the position, angle or speed of movement of the movable part are further reduced.

What is claimed is:

1. A device for transforming rotary motion to substantially linear motion of a movable part in a measuring machine, the device comprising:

an elongated transmission element having a high modulus of elasticity in a longitudinal direction and flexibility in a transverse direction;

a mechanical element to which a first end and a second end of said transmission element are fixed;

a movable part that is movable in a moving path across said mechanical element between said first and second ends of said transmission element and that is subjected to forces by at least two different portions of said transmission element to move said movable part linearly along the moving path;

a respective stationary turning point for said transmission element adjacent to each end of the moving path, said transmission element turning on one said stationary turning point between said two different portions of said transmission element;

a driver for imparting rotary motion to one said stationary turning point to move said movable part linearly; and a tension element for imparting a tensile stress to said transmission element.

2. The device according to claim 1, wherein said tension element comprises a spring pre-tensioner adjacent to one of said first and second ends of said transmission element.

3. The device according to claim 2, further comprising a controllable clamp adjacent to the one of said first and second ends of said transmission element next to said spring pre-tensioner, said clamp being controlled to clamp said transmission element while transforming to the linear motion and at other times to release said transmission element.

4. The device according to claim 1, wherein said tension element comprises a self-elasticity of said transmission element.

5. The device according to claim 1, wherein said transmission element is a rope.

6. The device according to claim 5, wherein said stationary turning points are wheels that are on each side of each end position for the movable part.

7. The device according to claim 6, wherein at least two of said wheels are so angled that said rope is tensioned in a straight line without obstructing a movement of the movable part.

* * * * *